(12) United States Patent
Odom et al.

(10) Patent No.: US 7,340,466 B2
(45) Date of Patent: Mar. 4, 2008

(54) TOPIC IDENTIFICATION AND USE THEREOF IN INFORMATION RETRIEVAL SYSTEMS

(75) Inventors: Paul S. Odom, Houston, TX (US); Subramanian Akileswar, Houston, TX (US); Robie Childers, Houston, TX (US); Dennis Kotlar, Houston, TX (US)

(73) Assignee: Kang Jo Mgmt. Limited Liability Company, Wilmington, DE (US)

( * ) Notice: Subject to any disclaimer, the term of this patent is extended or adjusted under 35 U.S.C. 154(b) by 818 days.

(21) Appl. No.: 10/086,026

(22) Filed: Feb. 26, 2002

(65) Prior Publication Data

US 2003/0167252 A1   Sep. 4, 2003

(51) Int. Cl.
*G06F 7/00* (2006.01)
*G06F 17/27* (2006.01)

(52) U.S. Cl. ............... 707/10; 707/3; 707/7; 707/6; 707/100; 704/1; 704/9; 704/10

(58) Field of Classification Search ............. 707/1–10, 707/102, 100; 715/512–514, 500, 531, 532–533; 345/700, 764; 706/12, 45; 704/1–10
See application file for complete search history.

(56) References Cited

U.S. PATENT DOCUMENTS

| | | | | |
|---|---|---|---|---|
| 4,580,218 A | * | 4/1986 | Raye | 707/1 |
| 5,265,065 A | * | 11/1993 | Turtle | 707/4 |
| 5,490,061 A | | 2/1996 | Tolin et al. | |
| 5,625,748 A | * | 4/1997 | McDonough et al. | 704/251 |
| 5,745,776 A | * | 4/1998 | Sheppard, II | 715/532 |
| 5,842,206 A | | 11/1998 | Sotomayor | |
| 5,924,105 A | * | 7/1999 | Punch et al. | 715/513 |
| 5,937,422 A | * | 8/1999 | Nelson et al. | 715/531 |
| 5,940,821 A | | 8/1999 | Wical | |
| 5,960,385 A | * | 9/1999 | Skiena et al. | 704/9 |
| 5,987,454 A | | 11/1999 | Hobbs | |
| 5,987,460 A | * | 11/1999 | Niwa et al. | 707/6 |
| 6,038,560 A | * | 3/2000 | Wical | 707/5 |
| 6,070,133 A | * | 5/2000 | Brewster et al. | 704/9 |
| 6,085,187 A | | 7/2000 | Carter et al. | |
| 6,115,718 A | * | 9/2000 | Huberman et al. | 707/102 |
| 6,125,362 A | * | 9/2000 | Elworthy | 707/6 |

(Continued)

OTHER PUBLICATIONS

"Autonomy Server™: Product Brief." 2 pgs. Accessed Feb. 22, 2002. (http://www.autonomy.com/perl/Register.perl?doc=/autonomy_v3/Media/Collaterals/Product_Briefs/PB_AutonomyServer_02.01.pdf).

(Continued)

*Primary Examiner*—John Breene
*Assistant Examiner*—Anh Ly
(74) *Attorney, Agent, or Firm*—Sterne, Kessler, Goldstein & Fox, P.L.L.C.

(57) ABSTRACT

A technique to determine topics associated with, or classifications for, a data corpus uses an initial domain-specific word list to identify word combinations (one or more words) that appear in the data corpus significantly more often than expected. Word combinations so identified are selected as topics and associated with a user-specified level of granularity. For example, topics may be associated with each table entry, each image, each sentence, each paragraph, or an entire file. Topics may be used to guide information retrieval and/or the display of topic classifications during user query operations.

38 Claims, 6 Drawing Sheets

U.S. PATENT DOCUMENTS

| | | | | |
|---|---|---|---|---|
| 6,212,532 | B1* | 4/2001 | Johnson et al. | 707/3 |
| 6,226,792 | B1 | 5/2001 | Goiffon et al. | |
| 6,233,575 | B1* | 5/2001 | Agrawal et al. | 707/2 |
| 6,236,958 | B1* | 5/2001 | Lange et al. | 704/8 |
| 6,363,378 | B1* | 3/2002 | Conklin et al. | 707/5 |
| 6,446,061 | B1* | 9/2002 | Doerre et al. | 707/3 |
| 6,460,034 | B1* | 10/2002 | Wical | 707/5 |
| 6,473,730 | B1* | 10/2002 | McKeown et al. | 704/9 |
| 6,505,151 | B1* | 1/2003 | Chou et al. | 704/9 |
| 6,529,902 | B1* | 3/2003 | Kanevsky et al. | 707/5 |
| 6,556,987 | B1* | 4/2003 | Brown et al. | 707/3 |
| 6,606,659 | B1* | 8/2003 | Hegli et al. | 709/225 |
| 6,665,661 | B1* | 12/2003 | Crow et al. | 707/3 |
| 6,678,694 | B1* | 1/2004 | Zimmermann et al. | 707/102 |
| 6,751,611 | B2* | 6/2004 | Krupin et al. | 707/3 |
| 6,775,677 | B1* | 8/2004 | Ando et al. | 707/102 |
| 2001/0056445 | A1* | 12/2001 | Meystel et al. | 707/513 |
| 2002/0046018 | A1* | 4/2002 | Marcu et al. | 704/9 |
| 2002/0099730 | A1* | 7/2002 | Brown et al. | 707/500 |
| 2002/0103799 | A1* | 8/2002 | Bradford et al. | 707/6 |
| 2003/0097375 | A1* | 5/2003 | Pennock et al. | 707/104.1 |
| 2003/0154071 | A1* | 8/2003 | Shreve | 704/9 |
| 2004/0024583 | A1* | 2/2004 | Freeman | 704/4 |
| 2004/0024739 | A1* | 2/2004 | Copperman et al. | 707/1 |
| 2004/0128267 | A1* | 7/2004 | Berger et al. | 707/1 |
| 2004/0199375 | A1* | 10/2004 | Ehsani et al. | 704/4 |
| 2005/0091211 | A1* | 4/2005 | Vernau et al. | 707/6 |
| 2005/0171761 | A1* | 8/2005 | Ju et al. | 704/10 |
| 2006/0129381 | A1* | 6/2006 | Wakita | 704/9 |
| 2006/0184354 | A1* | 8/2006 | Huang et al. | 704/6 |

OTHER PUBLICATIONS

"Autonomy Technology Whtie Paper." 19 pgs. Accessed Feb. 22, 2002. (http://www.autonomy.com/perl/Register.perl?doc=/autonomy_v3/Media/Collaterals/Autonomy_White_Papers/Autonomy_Technology_WP_0401.pdf).

"DolphinSearch Proprietarty Information." 10 pgs. Accessed Feb. 22, 2002. (http://www.dolphinsearch.com/downloads/dsWhitePaper2001.pdf).

"DolphinSearch Technology Summary." 2 pgs. Accessed Feb. 22, 2002. (http://www.dolphinsearch.com/downloads/Technology_Summary.pdf).

"Verity® Intelligent Classification: Turn Information Assets into Competitive Advantage." 13 pgs. Accessed Feb. 22, 2002. (http://www.verity.com/pdf/MK0349_int_class_wp.pdf).

"Verity® K2 Architecture: Unprecedented Performance, Scalability and Fault Tolerance." 9 pgs. Accessed Feb. 22, 2002. (http://www.verity.com/pdf/MK0366_K2Arch_WP.pdf.).

"Verity® Search: The Advantages of Advanced Information Retrieval." 13 pgs. Accessed Feb. 22, 2002. (http://www.verity.com/pdf/MK0348_Search_WP.pdf).

* cited by examiner

TOPIC IDENTIFICATION AND USE THEREOF IN INFORMATION RETRIEVAL SYSTEMS

BACKGROUND

The invention relates generally to computerized information management technologies and, more particularly but not by way of limitation, to the generation of relevant domain-specific topics for a corpus of data to facilitate subsequent search and retrieval operations for the data.

It is generally recognized that much of the world economic order is shifting from one based on manufacturing to one based on the generation, organization and use of information. To successfully manage this transition, organizations must collect and classify vast amounts of data so that it may be searched and retrieved in a meaningful manner. Traditional techniques to classify data may be divided into four approaches: (1) manual; (2) unsupervised learning; (3) supervised learning; and (4) hybrid approaches.

Manual classification relies on individuals reviewing and indexing data against a predetermined list of categories. For example, the National Library of Medicine's MEDLINE® (Medical Literature, Analysis, and Retrieval System Online) database of journal articles uses this approach. While manual approaches benefit from the ability of humans to determine what concepts a data represents, they also suffer from the drawbacks of high cost, human error and relatively low rate of processing. Unsupervised classification techniques rely on computer software to examine the content of data to make initial judgments as to what classification data belongs to. Many unsupervised classification technologies rely on Bayesian clustering algorithms. While reducing the cost of analyzing large data collections, unsupervised learning techniques often return classifications that have no obvious basis on the underlying business or technical aspects of the data. This disconnect between the data's business or technical framework and the derived classifications make it difficult for users to effectively query the resulting classifications. Supervised classification techniques attempt to overcome this drawback by relying on individuals to "train" the classification engines so that derived classifications more closely reflect what a human would produce. Illustrative supervised classification technologies include semantic networks and neural networks. While supervised systems generally derive classifications more attuned to what a human would generate, they often require substantial training and tuning by expert operators and, in addition, often rely for their results on data that is more consistent or homogeneous that is often possible to obtain in practice. Hybrid systems attempt to fuse the benefits of manual classification methods with the speed and processing capabilities employed by unsupervised and supervised systems. In known hybrid systems, human operators are used to derive "rules of thumb" which drive the underlying classification engines.

No known data classification approach provides a fast, low-cost and substantially automated means to classify large amounts of data that is consistent with the semantic content of the data itself. Thus, it would be beneficial to provide a mechanism to determine a collection of topics that are explicitly related to both the domain of interest and the data corpus analyzed.

SUMMARY

In one embodiment the invention provides a method to identify topics in a data corpus. The method includes determining a segment-level actual usage value for one or more word combinations, computing a segment-level expected usage value for each of the one or more word combinations, and designating a word combination as a topic if the segment-level actual usage value of the word combination is significantly greater than the segment-level expected usage value of the word combination.

In another embodiment, the invention provides a method to display a list of topics associated with stored data items. The method includes, identifying a result set based on an initial user query, identifying those topics associated with the stored data items identified in the result set, selecting for display a topic associated with the most identified stored data items, selecting for display another topic associated with the most identified stored data items not already associated with a previously identified display topic, and displaying the selected display topics. Wherein the act of selecting for display another topic is repeated until all, or a specified number, of the identified stored items have been accounted for in the displayed topics.

In yet other embodiments, the invention provides devices and systems to perform one or more of the afore-mentioned methods.

DETAILED DESCRIPTION

Techniques (methods and devices) to generate domain specific topics for a corpus of data are described. Other techniques (methods and devices) to associate the generated topics with individual documents, or portions thereof, for use in electronic search actions are also described. The following embodiments of the inventive techniques are illustrative only and are not to be considered limiting in any respect.

In one embodiment of the invention, a collection of topics is determined for a first corpus of data, wherein the topics are domain specific, based on a statistical analysis of the first data corpus and substantially automatically generated. In another embodiment of the invention, the topics may be associated with each "segment" of a second corpus of data, wherein a segment is a user-defined quantum of information. Example segments include, but are not limited to, sentences, paragraphs, headings (e.g., chapter headings, titles of manuscripts, titles of brochures and the like), chapters and complete documents. Data comprising the data corpus may be unstructured (e.g., text) or structured (e.g., spreadsheets and database tables). In yet another embodiment of the invention, topics may be used during user query operations to return a result set based on a user's query input.

Figure 1:
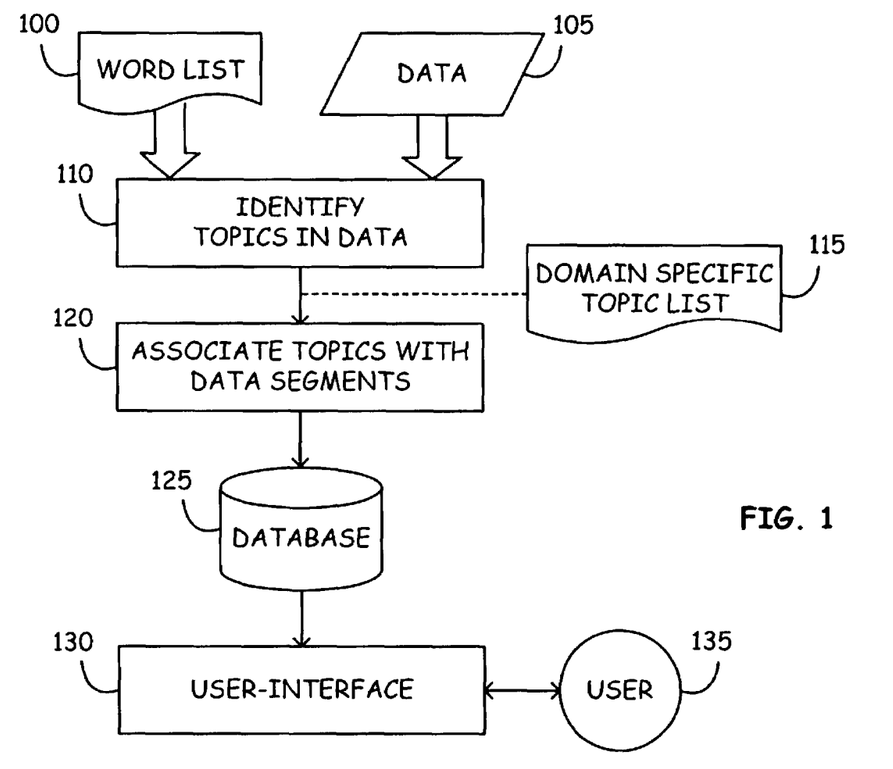
FIG. 1 shows, in flowchart form, a method to identify topics in a corpus of data in accordance with one embodiment of the invention.

Referring to FIG. 1, one method in accordance with the invention uses domain specific word list 100 as a starting point from which to analyze data 105 (block 110) to generate domain specific topic list 115. Once generated, topic list 115 entries may be associated with each segment of data 105 (block 120) and stored in database 125 where it may be queried by user 135 through user interface 130. Word list 100 may comprise a list of words or word combinations that are meaningful to the domain from which data 105 is drawn. For example, if data 105 represents medical documents then word list 100 may be those words that are meaningful to the medical field or those subfields within the field of medicine relevant to data 105. Similarly, if data 105 is drawn from the accounting, corporate governance or the oil processing and refining business, word list 100 will comprise words that hold particular importance to those fields. Data 105 may be substantially any form of data, structured or unstructured. In one embodiment, data 105 comprises unstructured text files such as medical abstracts and/or articles. In another embodiment, data 105 comprises books, newspapers, magazine content or a combination of these sources. In still another embodiment, data 105 comprises structured data such as design documents and spreadsheets describing an oil refinery process. In yet other embodiments, data 105 comprises content tagged image data, video data and/or audio data. In still another embodiment, data 105 comprises a combination of structured and unstructured data.

Acts in accordance with block 110 use word list 100 entries to statistically analyze data 105 on a segment-by-segment basis. In one embodiment, a segment may be defined as a sentence and/or heading and/or title. In another embodiment, a segment may be defined as a paragraph and/or heading and/or title. In yet another embodiment, a segment may be defined as a chapter and/or heading and/or title. In still another embodiment, a segment may be defined as a complete document and/or heading and/or title. Other definitions may be appropriate for certain types of data and, while different from those enumerated here, would be obvious to one of ordinary skill in the art. For example, headings and titles may be excluded from consideration. It is noted that only a portion of data 105 need be analyzed in accordance with block 110. That is, a first portion of data 105 may be used to generate topic list 115, with the topics so identified being associated with the entire corpus of data during the acts of block 120.

TABLE 1

Example Data

By way of example only, in one embodiment data 105 comprises the text of approximately 12 million abstracts from the Medline ® data collection. These abstracts include approximately 2.8 million unique words, representing approximately 40 Gigabytes of raw data. MEDLINE ® (Medical Literature, Analysis, and Retrieval System Online)

TABLE 1-continued

Example Data is the U.S. National Library of Medicine's (NLM) bibliographic database of journal articles covering basic biomedical research and the clinical sciences including: nursing, dentistry, veterinary medicine, pharmacy, allied health, pre-clinical sciences, environmental science, marine biology, plant and animal science, biophysics and chemistry. The database contains bibliographic citations and author abstracts from more than 4,600 biomedical journals published in the United States and 70 other countries. Medline ® is searchable at no cost from the NLM's web site at http://www.nlm.nih.gov.

Figure 2:
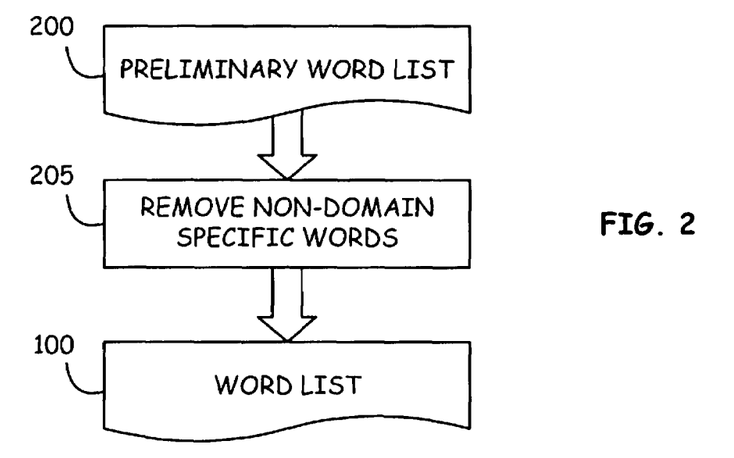
FIG. 2 shows, in flowchart form, a method to generate a domain specific word list in accordance with one embodiment of the invention.

Referring to FIG. 2, in one embodiment of the invention word list 100 may be generated by first compiling a preliminary list of domain specific words 200 and then pruning from that list those entries that do not significantly and/or uniquely identify concepts or topics within the target domain (block 205). Preliminary list 200 may, for example, be comprised of words from a dictionary, thesaurus, glossary, domain specific word list or a combination of these sources. For example, the Internet may be used to obtain preliminary word lists for virtually any field. Words removed in accordance with block 205 may include standard STOP words as illustrated in Table 2. (One of ordinary skill in the art will recognize that other STOP words may be used.) In addition, it may be beneficial to remove words from preliminary word list 200 that are not unique to the target domain. For example, while the word "reservoir" has a particular meaning in the field of oil and gas development, it is also a word of common use. Accordingly, it may be beneficial to remove this word from a word list specific to the oil and gas domain. In one embodiment, a general domain word list may be created that comprises those words commonly used in English (or another language), including those that are specific to a number of different domains. This "general word list" may be used to prune words from a preliminary domain specific word list. In another embodiment, some common words removed as a result of the general word list pruning just described may be added back into preliminary word list 200 because, while used across a number of domains, have a particular importance in the particular domain.

TABLE 2

Example Stop Words a, about, affect, after, again, all, along, also, although, among, an, and, another, any, anything, are, as, at, be, became, because, been, before, both, but, by, can, difference, each, even, ever, every, everyone, for, from, great, had, has, have, having, he, hence, here, his, how, however, I, if, in, inbetween, into, is, it, its, join, keep, last, lastly, let, many, may, me, more, most, much, next, no, none, not, nothing, now, of, on, only, or, other, our, pause, quickly, quietly, relationship, relatively, see, she, should, since, so, some, somebody, someone, something, sometimes, successful, successfully, such, take, than, that, the, their, there, these, they, this, those, thus, to, unusual, upon, us, use, usual, view, was, we, went, what, when, whence, where, whether, which, while, who, whose, will, with, within, without, yes, yet, you, your

TABLE 3

Example Word List

For the data set identified in Table 1, preliminary word list 200 was derived from the Unified Medical Language System Semantic Network (see http://www.nlm.nih.gov/databases/leased.html#umls) and included 4,000,000 unique single-word entries. Of these, roughly TABLE 3-continued Example Word List 3,945,000 were removed in accordance with block 205. Accordingly, word list 100 comprised approximately 55,000 one word entries. Example word list 200 entries for the medical domain include: abdomen, biotherapy, chlorided, distichiasis, enzyme, enzymes, freckle, gustatory, immune, kyphoplasty, laryngectomy, malabsorption, nebulizer, obstetrics, pancytopenia, quadriparesis, retinae, sideeffect, tonsils, unguium, ventricular, womb, xerostomia, yersinia, and zygote.

Conceptually, word list 100 provides an initial estimation of domain specific concepts/topics. Analysis in accordance with the invention beneficially expands the semantic breadth of word list 100, however, by identifying word collections (e.g., pairs and triplets) as topics (i.e., topic list 115). Once topics are identified, each segment in data 105 may be associated with those topics (block 120) that exist in that segment. Accordingly, if a corpus of data comprises information from a plurality of domains, analysis in accordance with FIG. 1 may be run multiple times—each time with a different word list 100. (Alternatively, each segment may be analyzed for each domain list before a next segment is analyzed.) In this manner, undifferentiated data (i.e., data not identified as belonging to one or another specific domain) may be automatically analyzed and "indexed" with topics. It is noted that word list 100 may be unique for each target domain but, once developed, may be used against multiple data collections in that field. Thus, it is beneficial to refine the contents of word list 100 for each domain so as to make the list as domain-specific as possible. It has been empirically determined that tightly focused domain-specific word lists yield a more concise collection of topics which, in turn, provide improved search results (see discussion below).

Figure 3:
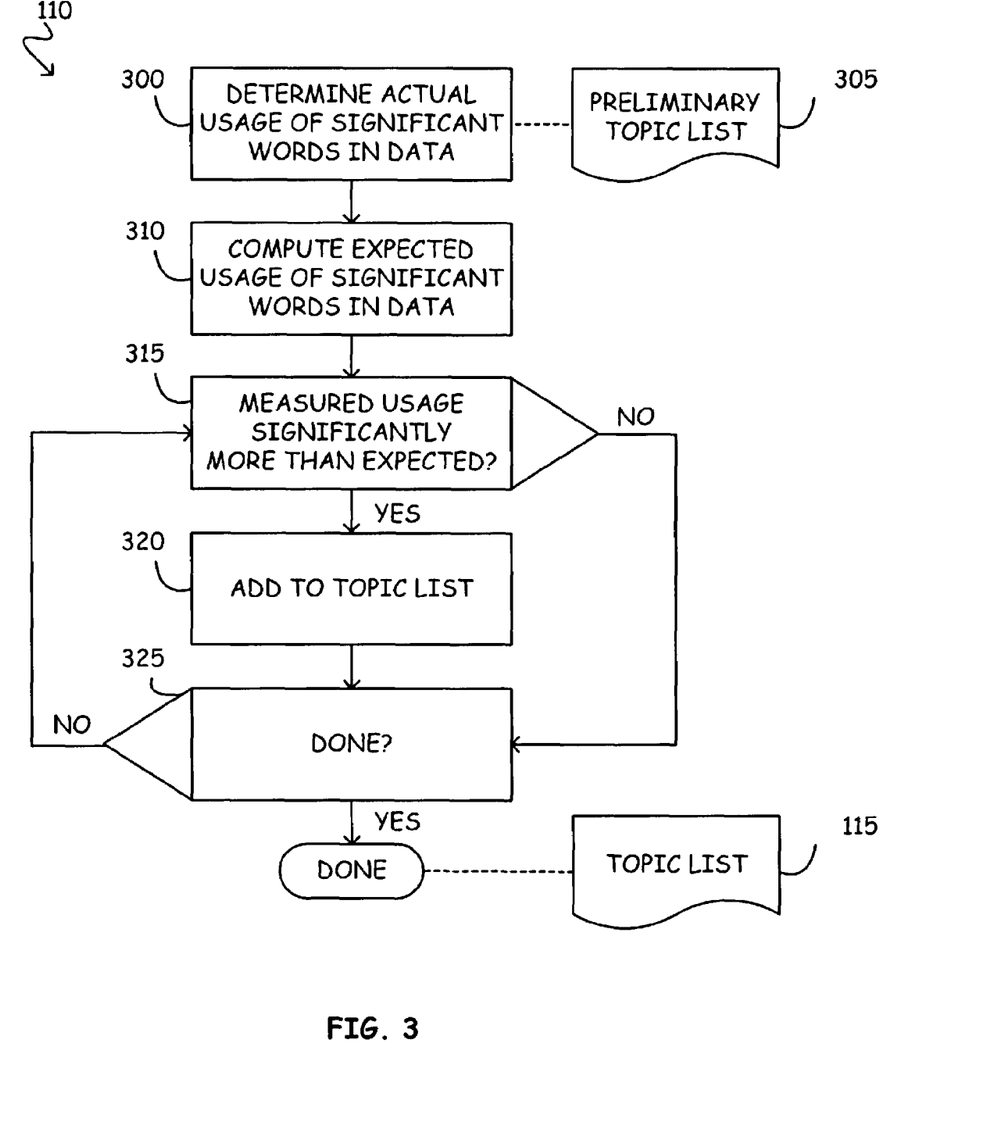
FIG. 3 shows, in flowchart form, a method to identify topics in a corpus of data in accordance with one embodiment of the invention.

FIG. 3 illustrates one method in accordance with the invention to identify topics (block 110 of FIG. 1) in data 105 using word list 100 as a starting point. Initially, data 105 (or a portion thereof) is analyzed on a segment-by-segment basis to determine the actual usage of significant words and word combinations (block 300). A result of this initial step is preliminary topic list 305. Next, an expected value for each entry in preliminary topic list 305 is computed (block 310) and compared with the actual usage value determined during block 300 (block 315). If the measured actual usage of a preliminary topic list entry is significantly greater than the computed expected value of the entry (the "yes" prong of block 315), that entry is added to topic list 115 (block 320). If the measured actual usage of a preliminary topic list entry is not significantly greater than the computed expected value of the entry (the "no" prong of block 315), that entry is not added to topic list 115. The acts of blocks 315 and 320 are repeated (the "no" prong of block 325) until all preliminary topic list 305 entries have been reviewed (the "yes" prong of block 325).

TABLE 4

Example Topic List

For the data set identified in Tables 1 and 3, 10 of the 35 Gigabytes were used to generate topic list 115. In accordance with FIG. 3, topic list 115 comprised approximately 506,000 entries. In one embodiment, each of these entries are double word entries.
Illustrative topics identified for Medline ® abstract content in accordance with the invention include: adenine nucleotide, heart disease, left ventricular, atria ventricles, heart failure, muscle, heart rate, fatty acids, loss bone, patient case, bone marrow, and arterial hypertension.

Figure 4:
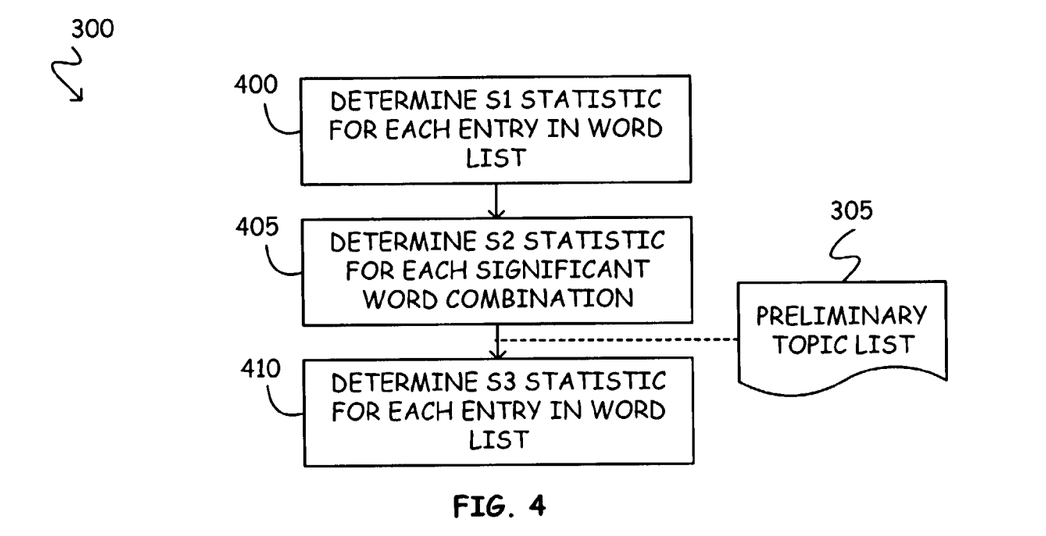
FIG. 4 shows, in flowchart form, a method to measure actual usage of significant words in a corpus of data in accordance with one embodiment of the invention.

As shown in FIG. 4, one method to measure the actual usage of significant words in data 105 (block 300) is to determine three statistics for each entry in word list 100: S1 (block 400); S2 (block 405); and S3 (block 410). In general, statistics S1, S2 and S3 measure the actual frequency of usage of various words and word combinations in data 105 at the granularity of the user-defined segment. More specifically:

Statistic S1 (block 400) is a segment-level frequency count for each entry in word list 100.

For example, if a segment is defined as a paragraph, then the value of S1 for word-i is the number of unique paragraphs in data 105 in which word-i is found.

An S1 value may also be computed for non-word list 100 words if they are identified as part of a word combination as described below with respect to statistic S2.

Statistic S2 (block 405) is a segment-level frequency count for each significant word combination in data 105. Those word combinations having a non-zero S2 value may be identified as preliminary topics 305. In one embodiment, a "significant word combination" comprises any two entries in word list 100 that are in the same segment. In another embodiment, a "significant word combination" comprises any two entries in word list 100 that are in the same segment and contiguous. In still another embodiment, a "significant word combination" comprises any two entries in word list 100 that are in the same segment and contiguous or separated only by one or more STOP words. In yet another embodiment, a "significant word combination" comprises any two words that are in the same segment and contiguous or separated only by one or more STOP words where at least one of the words in the word combination is in word list 100. In general, a "significant word combination" comprises any two or more words that are in the same segment and separated by 'N' or fewer specified other words: N may be zero or more; and the specified words are typically STOP words. As a practical matter, word combinations comprising non-word list 100 words may be ignored if they appear in less than a specified number of segments in data 105 (e.g., less than 10 segments).

For example, if a segment is defined as a paragraph, then the value of S2 for word-combination-i is the number of unique paragraphs in data 105 in which word-combination-i is found.

Statistic S3 (block 410) indicates the number of unique word combinations (identified by having non-zero S2 values, for example) each word in word list 100 was found in.

For example, if word-z is only a member of word-combination-i, word-combination-j and word-combination-k and the S2 statistic for each of word-combination-i, word-combination-j and word-combination-k is non-zero, then word-z's S3 value is 3.

One method to compute the expected usage of significant words in data 105 (block 310) is to calculate the expected value for each preliminary topic list 305 entry based only on its overall frequency of use in data 105. In one embodiment, the expected value for each word pair in preliminary word list 305 may be computed as follows:

$$\{S1(\text{word-i}) \times S1(\text{word-j})\} \div N,$$

where S1(word-i) and S1(word-j) represents the S1 statistic value for word-i and word-j respectively, and N represents the total number of segments in the data corpus being analyzed. One of ordinary skill in the art will recognize that the equation above may be easily extended to word combinations have more than two words.

Referring again to FIG. 3, with measured and computed usage values it is possible to determine which entries in preliminary topic list 305 are suitable for identifying topics within data 105. In one embodiment, the test (block 315) of whether a topic's measured usage (block 300) is significantly greater than the topic's expected usage (block 310), is a constant multiplier. For example, if the measured usage of preliminary topic list entry-i is twice that of preliminary topic list entry-i's expected usage, preliminary topic list entry-i may be added to topic list 115 in accordance with block 320. In another embodiment of the invention, if the measured usage of preliminary topic list entry-i is greater than a threshold value (e.g., 10) across all segments, then that preliminary topic list entry is selected as a topic. One of ordinary skill in the art will recognize alternative tests may also be used. For example, a different multiplier may be used (e.g., 1.5 or 3). Additionally, conventional statistical tests of significance may be used.

Figure 5:
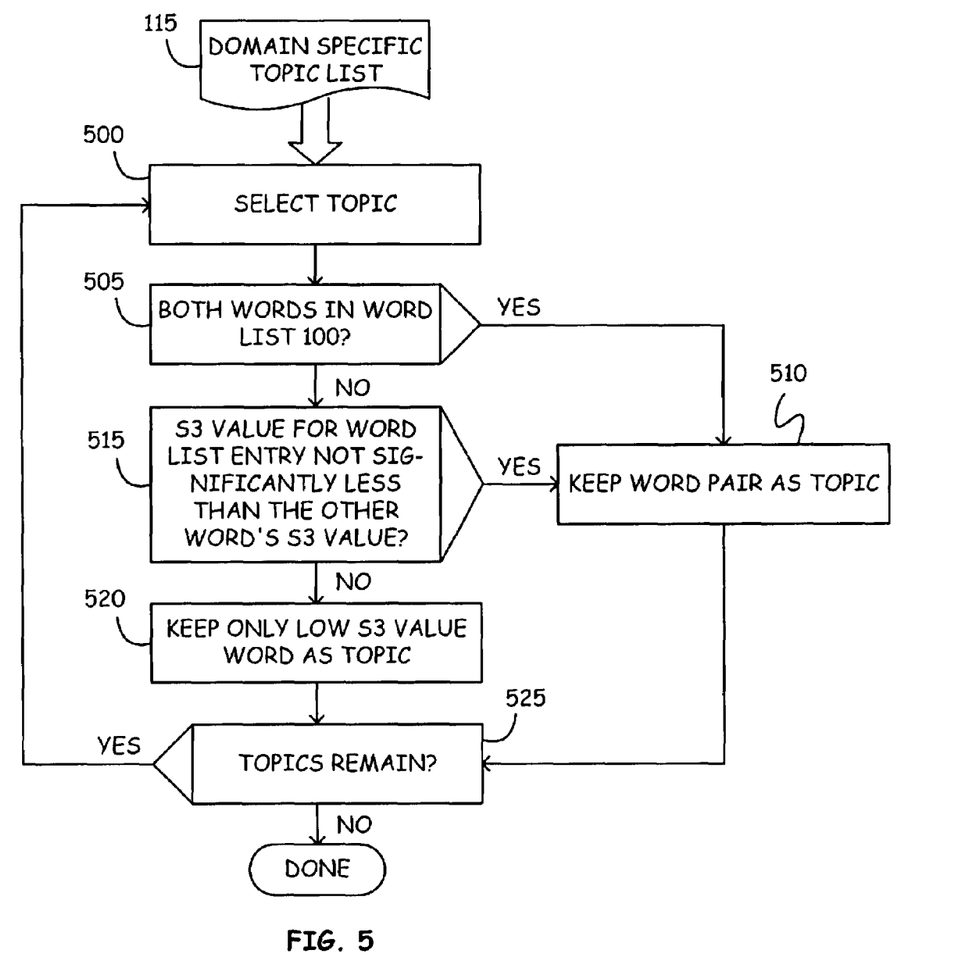
FIG. 5 shows, in flowchart form, a topic refinement process in accordance with one embodiment of the invention.

In one embodiment, topic list 115 may be refined in accordance with FIG. 5. (For convenience, this refinement process will be described in terms of two-word topics. One of ordinary skill in the art will recognize that the technique is equally applicable to topics having more than two words.) As shown, a first two word topic is selected (block 500). If both words comprising the topic are found in word list 100 (the "yes" prong of block 505), the two word topic is retained (block 510). If both words comprising the topic are not found in word list 100 (the "no" prong of block 505), but the S3 value for that word which is in word list 100 is not significantly less than the S3 value for the other word (the "yes" prong of block 515), the two word topic is retained (block 510). If, on the other hand, one of the topic's words is not in word list 100 (the "no" prong of block 505) and the S3 value for that word which is in word list 100 is significantly less than the S3 value for the other word (the "no" prong of block 515), only the low S3 value word is retained in topic list 115 as a topic (block 520). The acts of blocks 500-520 are repeated as necessary for each two word topic in topic list 115 (see block 525). In one embodiment, the test for significance (block 515) is based on whether the "high" S3 value is in the upper one-third of all S3 values and the "low" S3 value is in the lower one-third of all S3 values. For example, if the S3 statistic for a corpus of data has a range of zero to 12,000, a low S3 value is less then or equal to 4,000 and a "high" S3 value is greater then or equal to 8,000. In another embodiment, the test for significance in accordance with block 515 may be based on quartiles, quintiles or Bayesian tests. Refinement processes such as that outlined in FIG. 5 acknowledge word associations within data, while ignoring individual words that are so prevalent alone (high S3 value) as to offer substantially no differentiation as to content.

Referring again to FIG. 1, once topic list 115 is established, each segment in data 105 may associated with those topics which exist within it (block 120) and stored in database 125. Topics may be associated with a data segment in any desired fashion. For example, topics found in a segment may be stored as metadata for the segment. In addition, stored topics may be indexed for improved retrieval performance during subsequent lookup operations. Empirical studies show that the large majority of user queries are "under-defined." That is, the query itself does not identify any particular subject matter with sufficient specificity to allow a search engine to return the user's desired data in a result set (i.e., that collection of results presented to the user) that is acceptably small. A typical user query may be a single word such as, for example, "kidney." In response to under-defined queries, prior art search techniques generally return large result sets—often containing thousands, or tens of thousands, of "hits." Such large result sets are almost never useful to a user as they do not have the time to go through every entry to find that one having the information they seek.

Figure 6:
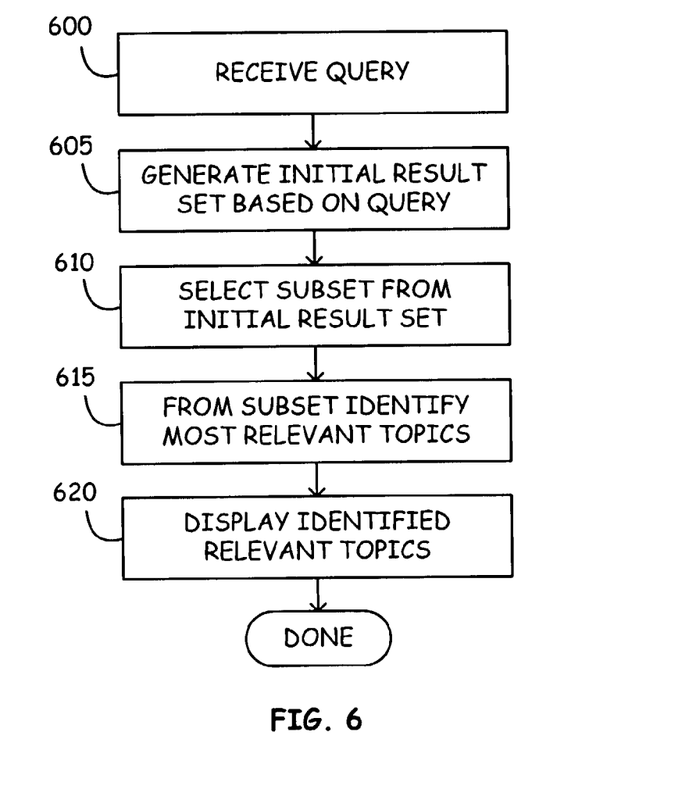
FIGS. 6 shows, in flowchart form, a topic identification method in accordance with one embodiment of the invention.

In one embodiment, topics associated with data segments in accordance with the invention may be used to facilitate data retrieval operations as shown in FIG. 6. When a user query is received (block 600) it may be used to generate an initial result set (block 605) in a conventional manner. For example, a literal text search of the query term may identify 100,000 documents (or objects stored in database 125) that contain the search term. From this initial result set, a subset may be selected for analysis in accordance with topics (block 610). In one embodiment, the subset is a randomly chosen 1% of the initial result set. In another embodiment, the subset is a randomly chosen 1,000 entries from the initial result set. In yet another embodiment, a specified number of entries are selected from the initial result set (chosen in any manner desired). While the number of entries in the result subset may be chosen in substantially any manner desired, it is preferable to select at least a number that provides "coverage" (in a statistical sense) for the initial result set. In other words, it is desirable that the selected subset mirror the initial result set in terms of topics. With an appropriately chosen result subset, the most relevant topics associated with those results may be identified (block 615) and displayed to the user (block 620).

Figure 7:
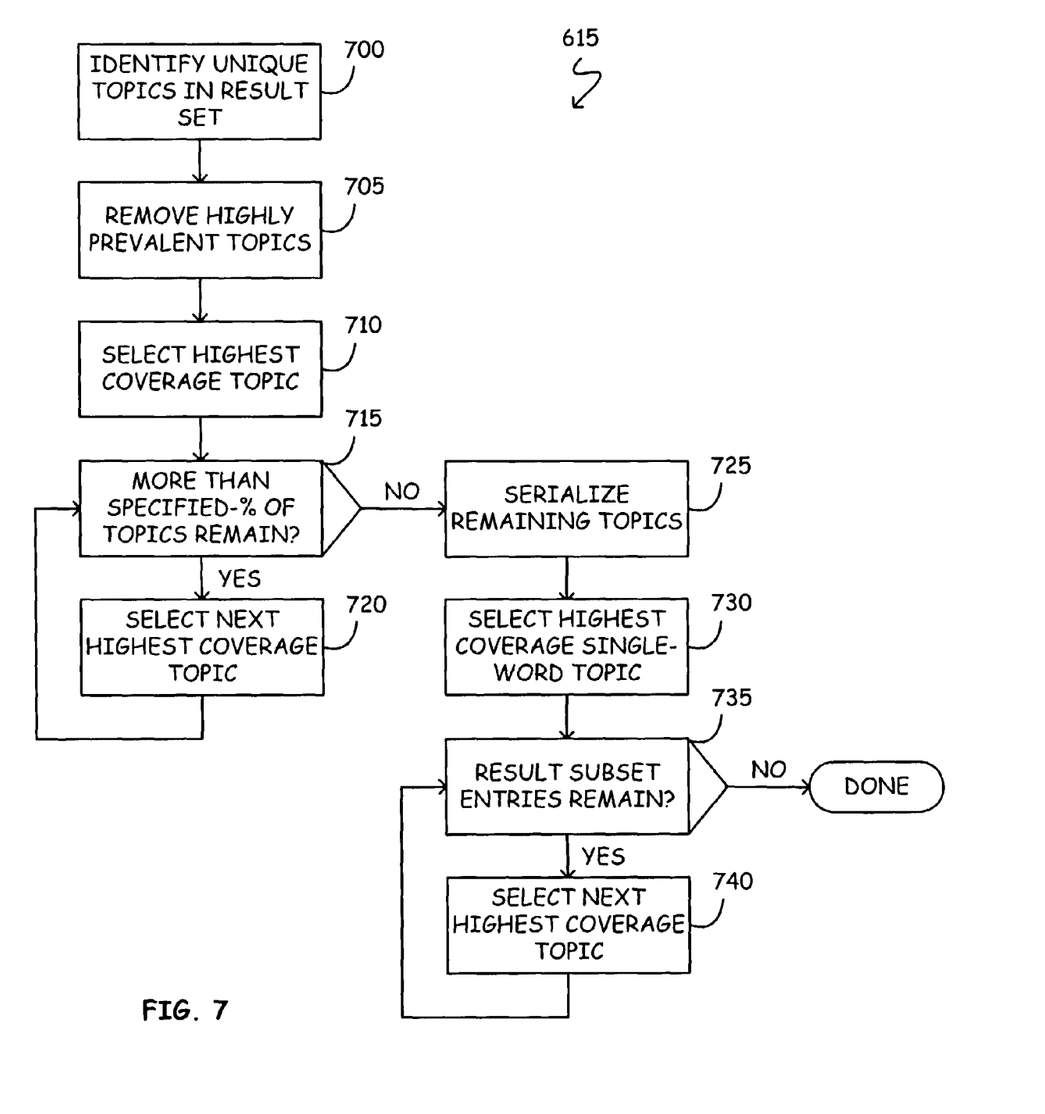
FIG. 7 shows, in flowchart form, one method in accordance with the invention to identify those topics for display during a user query operation.

FIG. 7 shows one method in accordance with the invention to identify those topics for display (block 615). Initially, all unique topics associated with the result subset are identified (block 700), and those topics that appear in more than a specified fraction of the result subset are removed (block 705). For example, those topics appearing in 80% or more of the segments comprising the result subset may be ignored for the purposes of this analysis. (A percentage higher or lower than this may be selected without altering the salient characteristics of the process.) Next, that topic which appears in the most result subset entries is selected for display (block 710). If more than one topic ties for having the most coverage, one may be selected for display in any manner desired. If, after ignoring those result subset entries associated with the selected topic, there remains more than a specified fraction of the result subset (the "yes" prong of block 715), that topic having the next highest coverage is selected (block 720). The process of blocks 715 and 720 is repeated until the remaining fraction of result subset entries is at or below the specified threshold. In one embodiment, the specified threshold of block 715 is 20%, although a percentage higher or lower than this may be selected without altering the salient characteristics of the process.

If, after ignoring those result subset entries associated with the selected topic(s), there remains less than a specified fraction of the result subset (the "no" prong of block 715), the remaining topics are serialized and duplicate words are eliminated (block 725). That is, topics comprising two or more words are broken apart and treated as single-word topics. Next, that single-word topic that appears in the most result subset entries not already excluded is selected for display (block 730). As before, if more than one topic ties for having the most coverage, one may be selected for display in any manner desired. If, after ignoring those result subset entries associated with the selected topic, result subset entries remain un-chosen (the "yes" prong of block 735), that topic having the next highest coverage is selected (block 740). The process of blocks 735 and 740 is repeated until all remaining result subset entries are selected for display (the "no" prong of block 735).

The topics identified in accordance with FIG. 7 may be displayed to the user (block 620 in FIG. 6). Thus, data retrieval operations in accordance with the invention return one or more topics which the user may select to pursue or refine their initial search. Optionally, a specified number of search result entries may be displayed in conjunction with the displayed topics. By selecting one or more of the displayed topics, a user may be presented with those data corresponding to the selected topics. (Topics may, for example, be combined through Boolean "and" and/or "or" operators.) In addition, the user may be presented with another list of topics based on the "new" result set in a manner described above. In summary, search operations in accordance with the invention respond to user queries by presenting a series of likely topics that most closely reflect the subjects that their initial search query relate to. Subsequent selection of a topic by the user, in effect, supplies additional search information which is used to refine the search.

TABLE 5

Example Query Result

For the data set identified in Tables 1, 3 and 4, a search on the single word "kidney" returns an initial result set comprising 147,549 hits. (That is, 147,549 segments had the word kidney in them.) Of these, 1,000 were chosen as a result subset. Using the specified thresholds discussed above, the following topics were represented in the result set: amino acid, dependent presence, amino terminal, kidney transplantation, transcriptional regulation, liver kidney, body weight, rat kidney, filtration fraction, rats treated, heart kidney, renal transplantation, blood pressure, and renal function. Selection of the "renal function" topic identified a total of 6,853 entries divided among the following topics: effects renal, kidney transplantation, renal parenchyma, glomerular filtration, loss renal, blood flow, histological examination, renal artery, creatinine clearance, intensive care, and renal failure. Selection of the "glomerular filtration" topic from this list identified a total of 1,400 entries. Thus, in two steps the number of "hits" through which a person must search was reduced from approximately 148,000 to 1,500-a reduction of nearly two orders of magnitude.

It is noted that retrieval operations in accordance with FIG. 6 may not be needed for all queries. For example, if a user query includes multiple search words or a quoted phrase that, using literal text-based search techniques, returns a relatively small result set (e.g., 50 hits or fewer), the presentation of this relatively small result set may be made immediately without resort to the topic-based approach of FIG. 6. What size of initial result set that triggers use of a topic-based retrieval operation in accordance with the invention is a matter of design choice. In one embodiment, all initial result sets having more than 50 hits use a method in accordance with FIG. 6. In another embodiment, only initial result sets having more than 200 results trigger use of a method in accordance with FIG. 6.

One of ordinary skill in the art will recognize that various changes in the details of the illustrated operational methods are possible without departing from the scope of the claims. For example, various acts may be performed in a different order from that shown in FIGS. 1 through 7. In addition, usage statistics other than those disclosed herein may be employed to measure a word's (or a word combination's) actual usage in a targeted corpus of data. Further, query result display methods in accordance with FIGS. 6 and 7 may use selection thresholds other than those disclosed herein.

Figure 8:
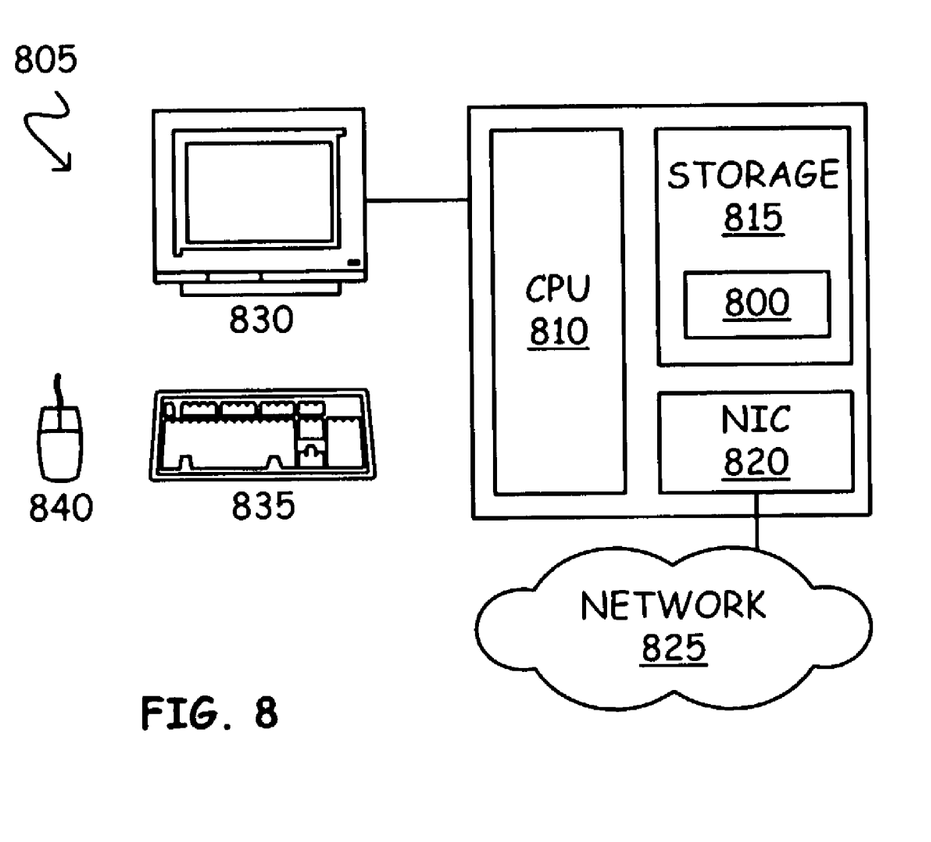
FIG. 8 shows, in block diagram form, a system in accordance with one embodiment of the invention.

Referring to FIG. 8, acts in accordance with any, or a portion of any, of FIGS. 1 through 7 may be performed by a programmable control device executing instructions organized into one or more program modules 800. In one embodiment, programmable control device comprises computer system 805 that includes central processing unit 810, storage 815, network interface card 820 for coupling computer system 805 to network 825, display unit 830, keyboard 835 and mouse 840. In addition to a single processor system shown in FIG. 8, a programmable control device may be a multiprocessor computer system or a custom designed state machine. Custom designed state machines may be embodied in a hardware device such as a printed circuit board comprising discrete logic, integrated circuits, or specially designed Application Specific Integrated Circuits (ASICs). Storage devices, such as device 815, suitable for tangibly embodying program module(s) 800 include all forms of non-volatile memory including, but not limited to: semiconductor memory devices such as Electrically Programmable Read Only Memory (EPROM), Electrically Erasable Programmable Read Only Memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to identify topics in a data corpus having a plurality of segments, comprising:

determining a segment-level actual usage value for one or more word combinations, wherein a word combination includes two or more substantially contiguous words, wherein two words are substantially contiguous if they are separated by zero words or words selected from a predetermined list of words;

computing a segment-level expected usage value for each of the one or more word combinations in accordance with $S(w_i) \times S(w_j) \times \ldots \times S(w_m)/N^{m-1}$ where "m" represents the number of words in the word combination, "N" represents the number of segments in the data corpus, and $S(w)$ represents the number of unique segments in the data corpus that word $w_i$ of the word combination is in;

designating a word combination as a topic if the segment level actual usage value of the word combination is greater than the segment-level expected usage value of the word combination; and storing the topic on a computer readable storage medium.

2. The method of claim 1, wherein each of the plurality of segments comprises a portion of a document.

3. The method of claim 2, wherein the portion of a document comprises a paragraph.

4. The method of claim 2, wherein the portion of a document comprises a heading.

5. The method of claim 2, wherein the portion of a document comprises the entire document.

6. The method of claim 1, wherein the predetermined list of words comprises STOP words.

7. The method of claim 1, wherein at least one word in each of the one or more word combinations is selected from a second predetermined list of words.

8. The method of claim 7, wherein the second predetermined list of words comprise a list of domain specific words.

9. The method of claim 1, wherein the act of determining a segment-level actual usage value for a word combination comprises determining the number of segments in the data corpus the word combination is in.

10. The method of claim 1, wherein the act of designating a word combination as a topic, comprises designating a word combination as a topic if the segment-level actual usage value of the word combination is greater than approximately twice the segment-level expected usage value of the word combination.

11. A program storage device, readable by a programmable control device, comprising instructions stored on the program storage device for causing the programmable control device to identify topics in a data corpus having a plurality of segments, the instructions causing the programmable control device to:
  determine a segment-level actual usage value for one or more word combinations, wherein a word combination includes two or more substantially contiguous words, wherein two words are substantially contiguous if they are separated by zero words or words selected from a predetermined list of words;
  compute a segment-level expected usage value for each of the one or more word combinations in accordance with $S(w_i) \times S(w_j) \times \ldots \times S(w_m)/N^{m-1}$ where "m" represents the number of words in the word combination, "N" represents the number of segments in the data corpus, and $S(w)$ represents the number of unique segments in the data corpus that word $w_i$ of the word combination is in; and
  designate a word combination as a topic if the segment level actual usage value of the word combination is greater than the segment-level expected usage value of the word combination.

12. The program storage device of claim 11, wherein the instructions for identifying topics in segments comprise instructions to identify topics in a portion of a document.

13. The program storage device of claim 12, wherein the instructions to identify topics in a portion of a document comprise instructions to identify topics in a paragraph.

14. The program storage device of claim 12, wherein the instructions to identify topics in a portion of a document comprise instructions to identify topics in an entire document.

15. The program storage device of claim 11, wherein the instructions to designate a word combination as a topic comprise instructions to designate a word combination as a topic only if at least one of the designated words is selected from a second predetermined list of words.

16. The program storage device of claim 15, wherein the instructions to designate words from the second predetermined list of words comprise instructions to select words from a domain specific word list.

17. The program storage device of claim 11, wherein the instructions to determine a segment-level actual usage value for a word combination comprise instructions to determine the number of segments in the data corpus the word combination is in.

18. The program storage device of claim 11, wherein the instructions to designate a word combination as a topic, comprise instructions to designate a word combination as a topic if the segment-level actual usage value of the word combination is greater than approximately twice the segment-level expected usage value of the word combination.

19. A method to display a list of topics associated with data items stored in a database, comprising:
  identifying a result set based on an initial user query, the result set identifying a plurality of stored data items;
  identifying those topics associated with the stored data items identified in the result set, wherein said topics are identified by a method as in claim 1;
  selecting for display a topic associated with the most identified stored data items;
  selecting for display another topic, said another topic associated with the most identified stored data items not associated with a previously identified display topic, wherein this step is repeated until all identified stored items in the result set have been accounted for; and
  displaying the selected display topics.

20. The method of claim 19, wherein the act of identifying a result set comprises:
  identifying an initial result set, the initial result set identifying a first plurality of stored data items; and
  selectively identifying a subset of the initial result set as the result set.

21. The method of claim 20, wherein the act of selectively identifying comprises randomly selecting a specified portion of the initial result set.

22. The method of claim 21, wherein the act of randomly selecting comprises randomly selecting approximately one percent of the initial result set.

23. The method of claim 19, wherein the act of identifying those topics associated with the stored data items identified in the result set, comprises generating a list of unique topics associated with the identified stored data items.

24. The method of claim 23, further comprising, removing from the generated list those topics that are associated with more than a specified fraction of the identified stored data items.

25. The method of claim 24, wherein the act of removing comprises removing from the generated list those topics that are associated with more than approximately eighty-percent (80%) of the identified stored data items.

26. The method of claim 19, further comprising, displaying a selected number of stored data item identifiers.

27. The method of claim 26, wherein the act of displaying a selected number of stored data item identifiers, comprises displaying a hyperlink.

28. The method of claim 19, wherein the act of selecting for display another topic, comprises determining when the number of data items not associated with a previously identified display topic is less than a specified value and, when this is true:
  generating a list of unique individual words from the topics not yet selected for display,
  selecting for display a unique word from the list of unique individual words associated with the most identified stored data items; and
  selecting for display another unique word from the list of unique individual words, said another unique word associated with the most identified stored data items not associated with a previously identified display topic and unique word, wherein this step is repeated until all identified stored items in the result set have been accounted for.

29. A program storage device, readable by a programmable control device, comprising instructions stored on the program storage device for causing the programmable control device to display a list of topics associated with data items stored in a database, the instructions causing the programmable control device to:

identify a result set based on an initial user query, the result set identifying a plurality of stored data items;

identify those topics associated with the stored data items identified in the result set, wherein said topics are identified by a method as in claim 1;

select for display a topic associated with the most identified stored data items;

select for display another topic, said another topic associated with the most identified stored data items not associated with a previously identified display topic, wherein this step is repeated until all identified stored items in the result set have been accounted for; and display the selected display topics.

30. The program storage device of claim 29, wherein the instructions to identify a result set comprise instructions to:

identify an initial result set, the initial result set identifying a first plurality of stored data items; and selectively identify a subset of the initial result set as the result set.

31. The program storage device of claim 30, wherein the instructions to selectively identify comprise instructions to randomly select a specified portion of the initial result set.

32. The program storage device of claim 31, wherein the instructions to randomly select comprise instructions to randomly select approximately one-percent of the initial result set.

33. The program storage device of claim 29, wherein the instructions to identify those topics associated with the stored data items identified in the result set, comprise instructions to generate a list of unique topics associated with the identified stored data items.

34. The program storage device of claim 33, further comprising instructions to remove from the generated list those topics that are associated with more than a specified fraction of the identified stored data items.

35. The program storage device of claim 34, wherein the instructions to remove comprise instructions to remove from the generated list those topics that are associated with more than approximately eighty-percent (80%) of the identified stored data items.

36. The program storage device of claim 29, further comprising instructions to display a selected number of stored data item identifiers.

37. The program storage device of claim 36, wherein the instructions to display a selected number of stored data item identifiers, comprise instructions to display a hyperlink.

38. The program storage device of claim 29, wherein the instructions to select for display another topic, comprise instructions to determine when the number of data items not associated with a previously identified display topic is less than a specified value and, when this is true:

generate a list of unique individual words from the topics not yet selected for display, select for display a unique word from the list of unique individual words associated with the most identified stored data items; and select for display another unique word from the list of unique individual words, said another unique word associated with the most identified stored data items not associated with a previously identified display topic and unique word, wherein these instructions are repeated until all identified stored items in the result set have been accounted for.

* * * * *